United States Patent
Zhang et al.

(10) Patent No.: US 11,588,891 B2
(45) Date of Patent: Feb. 21, 2023

(54) ACCESS PATTERN DRIVEN DATA PLACEMENT IN CLOUD STORAGE

(71) Applicant: Google LLC, Mountain View, CA (US)

(72) Inventors: Wangyuan Zhang, Fremont, CA (US); Vivienne Zhang, Santa Clara, CA (US); Pramod Gaud, San Jose, CA (US); Sangho Yoon, Palo Alto, CA (US); Xudong Shi, Sunnyvale, CA (US); Kaifeng Yao, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/673,128

(22) Filed: Nov. 4, 2019

(65) Prior Publication Data

US 2021/0136150 A1  May 6, 2021

(51) Int. Cl.
| | |
|---|---|
| *H04L 67/1097* | (2022.01) |
| *G06F 16/182* | (2019.01) |
| *G06N 20/00* | (2019.01) |
| *G06N 5/00* | (2023.01) |
| *H04L 65/401* | (2022.01) |
| *H04L 67/06* | (2022.01) |
| *H04L 67/568* | (2022.01) |

(52) U.S. Cl.
CPC ........ *H04L 67/1097* (2013.01); *G06F 16/183* (2019.01); *G06N 5/003* (2013.01); *G06N 20/00* (2019.01); *H04L 65/4015* (2013.01); *H04L 67/06* (2013.01); *H04L 67/568* (2022.05)

(58) Field of Classification Search
CPC . H04L 67/1097; H04L 67/06; H04L 67/2842; H04L 65/4015; G06F 16/183; G06N 20/00; G06N 5/003
See application file for complete search history.

(56) References Cited

U.S. PATENT DOCUMENTS

| | | | |
|---|---|---|---|
| 9,560,127 B2 | 1/2017 | Calo et al. | |
| 9,912,687 B1* | 3/2018 | Wescoe | .................. H04L 67/42 |
| 2005/0259682 A1* | 11/2005 | Yosef | ..................... H04L 12/18 |
| | | | 370/468 |

(Continued)

OTHER PUBLICATIONS

Tanzil et al.; Adaptive Scheme for Caching YouTube Content in a Cellular Network: Machine Learning Approach; IEEE Access; Mar. 7, 2017; vol. 5, pp. 5870-5881 (Year: 2017).*

(Continued)

*Primary Examiner* — Joshua D Taylor
(74) *Attorney, Agent, or Firm* — Lerner, David, Littenberg, Krumholz & Mentlik, LLP

(57) ABSTRACT

A system and method for storing data in a distributed network having a plurality of datacenters distributed over a plurality of geographic regions. The method may involve receiving data, including metadata, uploaded to a first datacenter of the distributed network, receiving access information about previous data that was previously stored in the plurality of datacenters of the distributed network, predicting one or more of the plurality of geographic regions from which the uploaded data will be accessed based on the metadata and the access information, and instructing the uploaded data to be transferred from the first datacenter to one or more second datacenters located at each of the one or more predicted geographic regions.

20 Claims, 6 Drawing Sheets

(56) References Cited

U.S. PATENT DOCUMENTS

| | | | | |
|---|---|---|---|---|
| 2009/0300322 A1* | 12/2009 | Mercer | ............... | H04L 63/10 |
| | | | | 711/219 |
| 2013/0091207 A1* | 4/2013 | Diab | ............... | G06Q 30/02 |
| | | | | 709/204 |
| 2014/0006357 A1* | 1/2014 | Davis | ............... | G06F 16/182 |
| | | | | 707/667 |
| 2015/0195599 A1* | 7/2015 | Su | ............... | H04N 21/242 |
| | | | | 725/93 |
| 2015/0370845 A1* | 12/2015 | Haustein | ............... | G06F 16/1827 |
| | | | | 707/690 |
| 2017/0216720 A1* | 8/2017 | Colenbrander | ............... | A63F 13/352 |
| 2020/0252202 A1* | 8/2020 | Madl | ............... | G06F 21/6218 |
| 2020/0252754 A1* | 8/2020 | Klinkner | ............... | G08B 21/0272 |

OTHER PUBLICATIONS

A. Amer: "Predictive data grouping using successor prediction," 2002.

Tanzil et al., Adaptive Scheme for Caching YouTube Content in a Cellular Network: Machine Learning Approach; IEEE Access; Mar. 7, 2017; vol. 5, pp. 5870-5881.

International Search Report and Written Opinion for International Application No. PCT/US2020/058641 dated Jan. 29, 2021. 16 pages.

* cited by examiner

ACCESS PATTERN DRIVEN DATA PLACEMENT IN CLOUD STORAGE

BACKGROUND

Global cloud storage services provide accessibility for large amounts of data from anywhere in the world once the data has been stored in the cloud. For example, an image uploaded in Europe may be immediately accessible for download in the United States.

Global cloud storage services are often divided into various geographical regions in order to manage the large volume of uploaded data. As such, a user request to access data is typically routed to a server nearest to the user, and particularly in the user's geographic region. The server then looks up the location of the requested data, and then forwards a request for the data to the server where the data is stored, which may be in a different geographic region.

When requested data is stored far from the requesting user, fetching the requested data may incur a high latency, which may degrade the requesting user's experience of the requested data. The long distance fetch also costs precious bandwidth for the service vendor, especially if there is a scarcity of network bandwidth between the user's geographic region and the data's geographic region, such as if not enough optic fiber cables are deployed between the two regions.

Global cloud storage services commonly store uploaded data in the region from which the data is uploaded. This may be effective in those cases where the uploaded data is primarily downloaded in the same geographic region. However, in many cases, uploaded data is accessed primarily from other geographical regions, which could result in high network bandwidth costs.

BRIEF SUMMARY

One aspect of the present disclosure is directed to a method for storing data in a distributed network having a plurality of datacenters distributed over a plurality of geographic regions. The method may include receiving, by one or more processors, data uploaded to a first datacenter of the distributed network, the uploaded data including metadata, receiving, by the one or more processors, access information about previously uploaded data, prior to the uploaded data being accessed, predicting, by the one or more processors, one or more of the plurality of geographic regions from which the uploaded data will be accessed based on the metadata and the access information, and instructing, by the one or more processors, the uploaded data to be transferred from the first datacenter to one or more second datacenters located at each of the one or more predicted geographic regions.

In some examples, the access information may be derived from a predictive model trained on metadata of the previously uploaded data.

In some examples, the predictive model may be a decision tree model.

In some examples, the metadata may include an identification of a user uploading the uploaded data, and a location from which the uploaded data is uploaded.

In some examples, the metadata of the previously uploaded data may include a location of the previously uploaded data, an identification of a user uploading the previously uploaded data and a location from which the previously uploaded data is uploaded.

In some examples, the metadata of the previously uploaded data may include an identification of a directory or a file path at which the previously uploaded data is stored.

In some examples, the access information may indicate an amount of time between an initial upload of the previously uploaded data and a first download of the previously uploaded data. The method may include predicting, by the one or more processors, an amount of time until the uploaded data is downloaded for a first time, and instructing, by the one or more processors, the uploaded data to be transmitted to one or more caching servers located at the one or more predicted geographic regions, based on the predicted amount of time.

In some examples, instructing the uploaded data to be transmitted to one or more caching servers located at the one or more predicted geographic regions may include determining, by the one or more processors, that the uploaded data is broadcast data based on the metadata and the access information, and for each given predicted geographic region, instructing, by the one or more processors, the uploaded data to be transferred to at least one caching server of each datacenter of the given predicted geographic region.

In some examples, the method may include instructing, by the one or more processors, the uploaded data to be included in a file including previously uploaded data having a common predicted geographic region, and instructing, by the one or more processors, the file to be transferred to one or more second datacenters located at the common predicted geographic region.

In some examples, the file may be initially stored at one or more source servers located at first datacenter. Instructing the file to be transferred may include instructing, by the one or more processors, data servers of the one or more second datacenters located at the common predicted geographic region to pull the file from the one or more source servers.

Another aspect of the present disclosure is directed to a system for storing data in a distributed network having a plurality of datacenters distributed over a plurality of geographic regions. The system may include one or more storage devices at a first datacenter of the distributed network, configured to store data uploaded to the first datacenter, the uploaded data including metadata, and one or more processors in communication with the one or more storage devices. The one or more processors may be configured to receive access information about previously uploaded data that was previously stored in the plurality of datacenters of the distributed network, prior to the uploaded data being accessed, predict one or more of the plurality of geographic regions from which the uploaded data will be accessed based on the metadata and the access information, and instruct, the uploaded data to be transferred from the first datacenter to one or more second datacenters located at each of the one or more predicted geographic regions.

In some examples, the access information may be derived from a predictive model trained on metadata of the previously uploaded data.

In some examples, the predictive model may be a decision tree model.

In some examples, the metadata may include an identification of a user uploading the uploaded data, and a location from which the uploaded data is uploaded.

In some examples, the metadata of the previously uploaded data may include a location of the previously uploaded data, an identification of a user uploading the previously uploaded data and a location from which the previously uploaded data is uploaded.

In some examples, the metadata of the previously uploaded data may include an identification of a directory or a file path at which the previously uploaded data is stored.

In some examples, the access information may indicate an amount of time between an initial upload of the previously uploaded data and a first download of the previously uploaded data. The one or more processors may be configured to predict an amount of time until the uploaded data is downloaded for a first time, and instruct the uploaded data to be transmitted to one or more caching servers located at the one or more predicted geographic regions, based on the predicted amount of time.

In some examples, the one or more processors may be configured to instruct the uploaded data to be transmitted to one or more caching servers located at the one or more predicted geographic regions based on a determination that the uploaded data is broadcast data based on the metadata, and for each given predicted geographic region, the one or more processors may be configured to instruct the uploaded data to be transferred to at least one caching server of each datacenter of the given predicted geographic region.

In some examples, the one or more processors may be configured to instruct the uploaded data to be included in a file including previously uploaded data having a common predicted geographic region, and instruct the file to be transferred to one or more second datacenters located at the common predicted geographic region.

In some examples, the file is initially stored at one or more source servers located at first datacenter. The one or more processors may be configured to instruct data servers of the one or more second datacenters located at the common predicted geographic region to pull the file from the one or more source servers.

DETAILED DESCRIPTION

Overview

Figure 1:
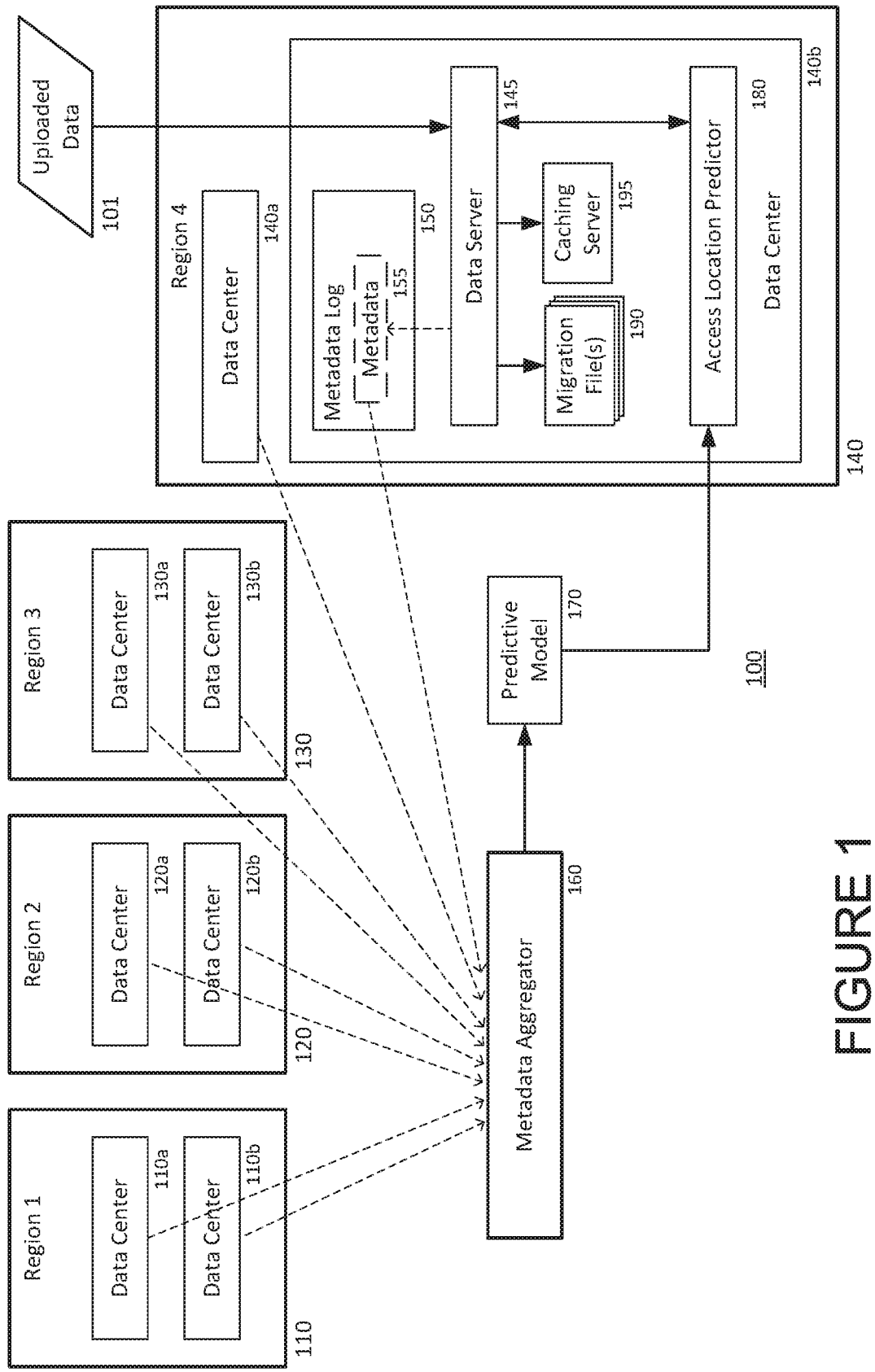
FIG. 1 is a block diagram illustrating an example system according to aspects of the disclosure.

The technology relates generally to a system for efficiently storing uploaded data across a distributed network. The system may include a location predictor or prediction program that predicts the location or locations from which an uploaded data file may be accessed in the future. The prediction may be based on uploading and downloading patterns, also referred to as "access patterns," of previously uploaded data. Predicting access patterns of newly uploaded data can improve storage efficiency of the uploaded data, since the data can be strategically stored close to those locations from which it will be accessed in the future.

In some implementations, the prediction program can be stored in a distributed network having multiple virtual machines across one or more datacenters. The uploaded data may begin by being stored in any datacenter of the network. Subsequently, the uploaded data is analyzed by the prediction program, and migrated to one or more other datacenters at which the uploaded data is predicted to be downloaded.

Predictions may be based on metadata included in each of the uploaded data and the previously uploaded data. For example, metadata of previously uploaded data may be used to train a predictive model, whereby the metadata may be related to various predictors of the model. Metadata of the uploaded data may be the same or similar to that of the previously uploaded data, whereby these similarities between the uploaded data and certain previously uploaded data may indicate a future access pattern of the uploaded data.

In some implementations, the uploaded data may be transferred to the datacenters using offline data migration techniques. For example, separate large files may be set up to store uploaded data based on the destination datacenter of the data, whereby each large file has a different destination datacenter. Newly uploaded data may then be appended to one or more large files based on the datacenters at which the uploaded data is predicted to be downloaded. Data migration of the uploaded data may then be performed on a per-file basis, for instance, when a given file reaches a certain size limit, or after a predefined amount of time, such as 12 hours, has elapsed.

In some implementations, the metadata may also be used to predict an urgency for migrating the uploaded data to its destination. For example, in the case of broadcast data, such as a streamed file broadcast from one user and made immediately accessible to other users worldwide, may be in high demand across multiple regions both immediately as well as at a later time offline data migration may take too long to deliver the uploaded data to its destination datacenter. In such a case, identifying an urgency of migrating the data may be used to initiate a cache injection of the uploaded data, whereby the data is transferred to a caching server at the destination datacenter from which the data may be served to users locally. The cache injection may be performed in addition to, and prior to, the offline data migration.

The above implementations can improve storage service of unstructured data within the distributed network, particularly for distributed networks having multiple datacenters spread out across multiple geographic regions. The improved storage service may make data that is uploaded in one part of the world more readily accessible in other parts of the world where the data is commonly accessed. This in turn can result in cost and time savings for users and service providers, since accessing data from a distant location is generally more costly and more time consuming than accessing data from a nearby location.

Example Systems

FIG. 1 is a block diagram illustrating an example system including a distributed computing environment. The system 100 may be a cloud storage service providing users with the ability to upload data 101 to servers distributed across multiple geographic regions 110, 120, 130, 140 of the system 100. Each geographic region may include one or more datacenters. FIG. 1 shows datacenters 110*a* and 110*b* of Region 1 (110), datacenters 120*a* and 120*b* of Region 2 (120), datacenters 130*a* and 130*b* of Region 3 (130), and datacenters 140*a* and 140*b* or Region 4 (140), although the network may include additional regions, and each region may include additional datacenters. Each datacenter may include one or more data servers 145 configured to store the uploaded data.

The datacenters 110a, 110b, 120a, 120b, 130a, 130b, 140a, 140b may be communicatively coupled, for example, over a network (not shown). The datacenters may further communicate with one or more client devices (not shown) over the network. Thus, for example, a client may execute operations in "the cloud." Such operations may include uploading and accessing data, such as uploaded data 101. Accessing data may include downloading the data, streaming the data, copying data from one folder or directory to another, or any other means by which data is made accessible in response to a user request received at a server of the system 100. In some examples, the datacenters may further communicate with a controller (not shown); thus, accessing the data may include making the data accessible in response to an instruction from the controller.

The datacenters 110a, 110b, 120a, 120b, 130a, 130b, 140a, 140b may be positioned a considerable distance from one another. For example, the datacenters may be positioned in various countries around the world. The regions 110, 120, 130, 140 may group datacenters in relative proximity to one another. Further, in some examples the datacenters may be virtualized environments. Further, while only a few datacenters are shown, numerous datacenters may be coupled over the network and/or additional networks.

Figure 2:
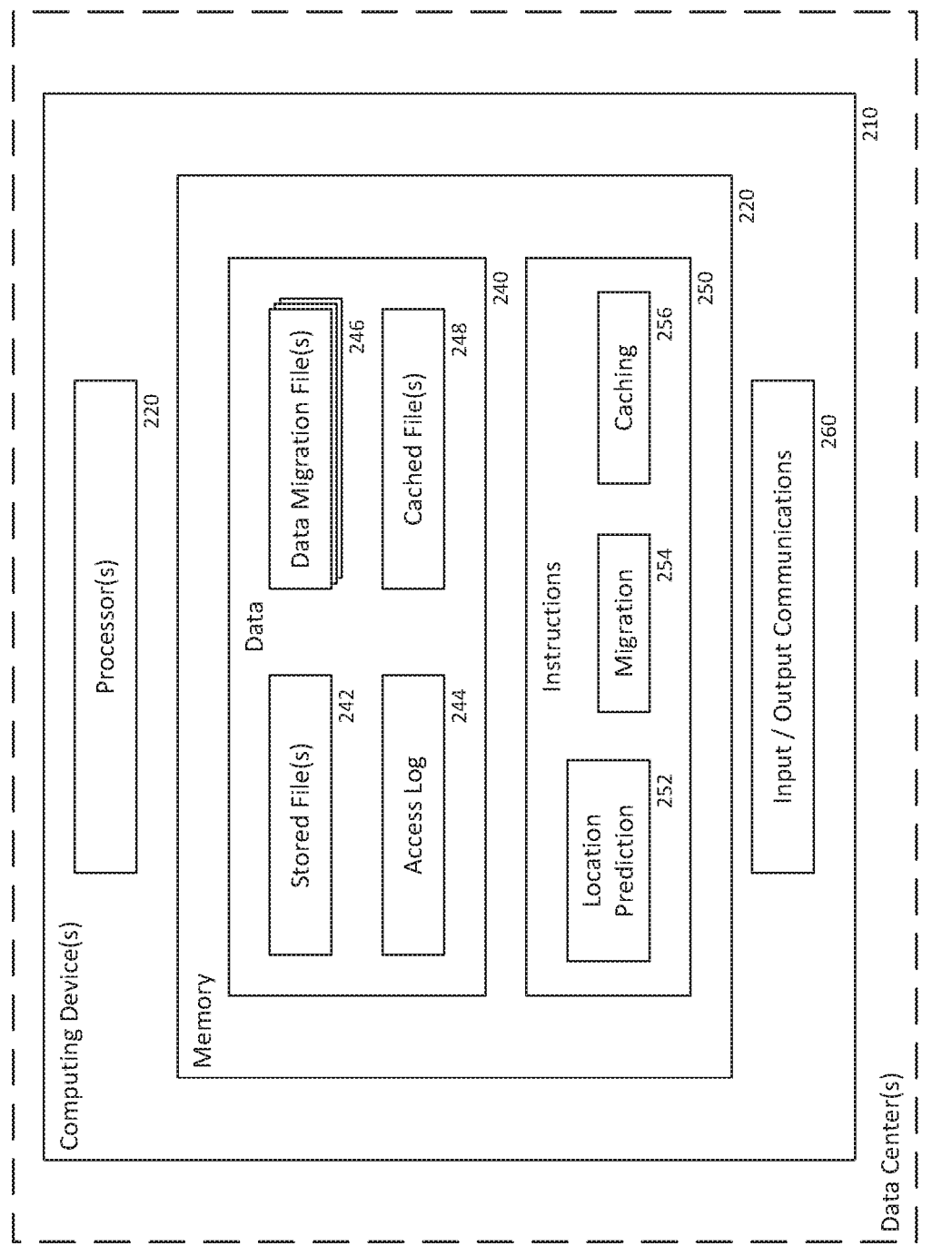
FIG. 2 is a block diagram illustrating an example computing system according to aspects of the disclosure.

As shown in FIG. 2, each datacenter may include one or more computing devices 210, such as processors 220, servers, shards, cells, or the like. It should be understood that each datacenter may include any number of computing devices, that the number of computing devices in one datacenter may differ from a number of computing devices in another datacenter, and that the number of computing devices in a given datacenter may vary over time, for example, as hardware is removed, replaced, upgraded, or expanded.

Each datacenter may also include a number of storage devices or memory 230, such as hard drives, random access memory, disks, disk arrays, tape drives, or any other types of storage devices. The datacenters may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as communication devices 260 to enable input and output between the computing devices of the same datacenter or different datacenters, between computing devices of the datacenters and controllers (not shown) of the network system, and between the computing devices of the datacenters and client computing devices (not shown) connected to the network system, such as cabling, routers, etc.

Memory 230 of each of the computing devices can store information accessible by the one or more processors 220, including data 240 that is received at or generated by the one or more computing devices 210, and instructions 250 that can be executed by the one or more processors 220.

The data 240 may include stored data 242 such as uploaded data objects, a metadata log 244 tracking metadata of the uploaded data objects 242, as well as one or more migration files 246 and cached data files 248 at which uploaded data objects 242 may be stored before being transferred from one datacenter to another. Details of the above examples of stored data are discussed in greater detail below.

The instructions 250 may include a location access prediction program 252 configured to predict the location or locations at which a given data object file is likely to be accessed. Such locations may be one or more regions of the distributed network. The instructions 250 may further include a data migration program 254 and a data caching program 256 configured to execute the transfer of data object files stored in the one or more migration files 246 and cached data files 248, respectively. Details of the above examples of stored programs are also discussed in greater detail below.

In some examples, the controller may communicate with the computing devices in the datacenters, and may facilitate the execution of programs. For example, the controller may track the capacity, status, workload, or other information of each computing device, and use such information to assign tasks. The controller may include a processor and memory, including data and instructions. In other examples, such operations may be performed by one or more of the computing devices in one of the datacenters, and an independent controller may be omitted from the system.

The uploaded data 101 uploaded to the datacenters may include metadata, indicating various properties of the uploaded data. The metadata may be logged at the datacenter to which the data is uploaded (in the example of FIG. 1, datacenter 140b), stored, or both. In the example of FIG. 1, a metadata log 150 is provided in datacenter 140b to store the metadata 155 of the uploaded data.

The metadata 155 may include an identification of a region, datacenter, or both, to which the data is uploaded. As discussed in greater detail below, because uploaded data is strategically migrated between geographical regions, in some cases the location at which the data is uploaded may differ from the location at which the data is stored. Additionally, in some cases, data may be stored in multiple locations, including or excluding the location to which it is uploaded. In such cases, the metadata may further include an identification of the region, datacenter, or both, at which the data is stored.

Other metadata may include, but is not limited to, a customer identification of the uploading party, an object name, an object type, an object size, a name of a directory or folder to which the data is uploaded (such as a bucket name used to store the object), an object name prefix (such as a file path of the uploaded object if more than one level of directory hierarchy is used to store the object), a time of upload, a time of first download, subsequent downloads are their times, a number of access requests, and so on. Essentially, the metadata may include both properties of the object, as well as a running access log for the object.

Additionally, in those cases where the data is stored in multiple locations, it should be recognized that each location may be associated with different metadata for the same data object. For example, the object stored in Region 1 may be downloaded sooner than the same object that is stored in Region 2. For further example, the number of access requests for the object may vary from one location to the next. As such, metadata from the uploaded object may be separately logged at each location where the object is ultimately stored. In the example of FIG. 1, each of the datacenters 110a, 110b, 120a, 120b, 130a, 130b, 140a, 140b, may include its own access log (not shown except for datacenter 140b), which may store a log of data objects or files that have been uploaded to that datacenter, including the metadata of those objects.

Metadata for each uploaded object may be tracked across the multiple regions using a metadata aggregator 160. The aggregator 160 may be capable of collecting metadata from the metadata logs of each datacenter on a regular basis, such as according to an aggregation schedule. The aggregated metadata may be timestamped to enable changes in the metadata to be tracked over time. For instance, aggregated logs collected by the metadata log aggregator may be categorized according to a duration of time represented by each aggregated log, such as metadata from the previous week, metadata from the previous month, metadata from the previous three months, metadata from a time period longer than the previous three months, and so on. Differences in metadata across the categorized logs may indicate changes in the uploaded data over time, such as an increasing or a decreasing interest in accessing the uploaded data. Additionally, metadata for a given uploaded data object may be tracked as a whole, or per storage location. Thus, the aggregated logs may indicate overall changes in metadata for a given uploaded data object, as well as region-specific or datacenter-specific changes for the uploaded data object.

The aggregated data may then be fed to a predictive model 170 in order to train the model 170 to predict where future uploaded data is most likely to be accessed. The predictive model 170 may be a machine learning algorithm stored in the system 100, such as at one of the datacenters of the system. The predictive model may be decision tree model, whereby the aggregated data may include information about how often and from where previous uploaded data was accessed, and thus may associate a cost with the placement of the previously uploaded data in the system. Based on this information, the predictive model 170 may determine strategic placements for future uploaded data based on the access patterns of the past uploaded data.

In other examples, other types of machine learning algorithms may be applied in order to build the predictive model. Also, more heuristic type methods may be possible, whereby certain information may dictate placement of future uploaded data. For example, if several previously uploaded data objects uploaded by a given user have a threshold number of downloads in certain regions, this may warrant future data objects uploaded by that user to be sent to and stored at the regions having the threshold number of downloads.

The predictive model 170 may be dynamic. For example, the aggregation of metadata and access logs by the aggregator 160 may occur on a consistent, and possible scheduled, basis, such as once every week, once every two weeks, once every month, or less or more frequently. The frequency at which the model is updated may further depend on the nature of data stored and shared on the particular network to which this system 100 is being applied. That is, for some products having relatively slow change, once a month may be sufficient. However, for other platforms or products where user tendencies are constantly changing and access patterns are constantly shifting, a once-a-month update may be insufficient, as more regular updated of the model, such as once a week, may be preferable.

Once the predictive model 170 has been trained on previously uploaded and stored data, it may be used to predict where current or future uploaded data will most likely be accessed. In the example of FIG. 1, when a given unit of uploaded data 101 is received at the datacenter 140b, the data is initially stored in the data server 145 as it is processed by the access location predictor 180. The access location predictor 180 may determine whether the data is likely to be accessed in the same region as which it was uploaded, whether the data is likely to be accessed in another region of the system. The access location predictor 180 may further predict an amount of time between the uploaded data 101 being uploaded and it being downloaded. Based on these determinations, the uploaded data 101 may remain stored in the data server 145, may be stored at one or more migration files 190, may be stored in the caching server 195, or any combination thereof. Storage determination operations are discussed in greater detail below in connection with FIG. 5.

Storage in the data server 145 is generally permanent, meaning that the data is intended to be stored there and not moved, and thus may remain stored indefinitely or until manually deleted. By contrast, storage in the migration files 190 and caching server 195 is generally temporary, meaning that the data is intended to be transferred to another location and may deleted automatically at a time after the intended transfer. Data transfer operations are discussed in greater detail below in connection with FIG. 6.

Although the migration files 190 are shown separately from the data server in FIG. 1, it should be recognized that the migration files may actually be stored at one or more servers of the datacenter 140b, and thus may be stored at the data server. Additionally, while the contents of the migration files may be regularly deletes, such as after the migration, the file itself may be permanent. Furthermore, the file may include permanent information, such as header information, indicating a destination to which the contents of the file are to be sent. The migration files may be files of a distributed file system of the network. It should also be recognized that data stored in the data servers may also be stored in large files of the distributed file system. Effectively, the large files of the data server may be the files having information indicating that the contents of the file are at their intended destination. For example, a file written to the data server 145 of datacenter 140b may have a header indicating a destination of Region 4, whereby it may be determined that the contents of the file do not need to be sent to a different region.

The caching servers 195 may be used by the datacenter for both predictive injection caching as described herein, as well as for on-demand caching for actually data requests (as compared to the speculated requests that trigger injection, as described herein).

For purposes of illustration, the metadata aggregator 160 and the predictive model 170 of FIG. 1 are shown separately from each of the geographical regions 110, 120, 130, 140 and datacenters, and the access location predictor 180 is shown as being included in datacenter 140b. However, it should be recognized that the data stored at, and the instructions executed by the aggregator 160, the predictive model 170, and the access location predictor 180 may be anywhere in the system, such as in the regions and datacenters shown, or in other regions or datacenters not shown, or any combination thereof, including distributed across multiple datacenters of a geographical region, or distributed across multiple geographical regions of the system.

Example Methods

Figure 3:
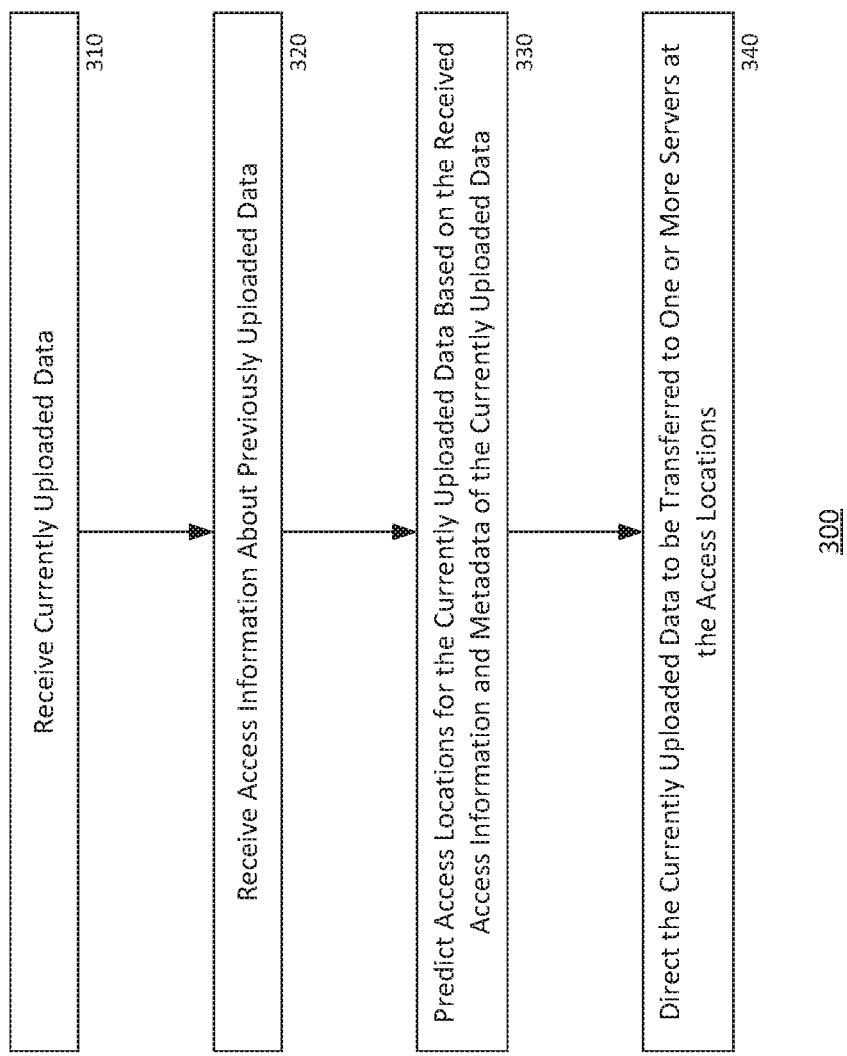
FIGS. 3 and 4 are block diagrams illustrating an example data distribution scheme of a system according to aspects of the disclosure.

FIG. 3 is a flow diagram illustrating an example routine 300 for storing data in a distributed network. The network may include multiple datacenters, such as datacenters 110a, 110b, 120a, 120b, 130a, 130b, 140a and 140b of FIG. 1, distributed over various geographic regions, such as regions 110, 120, 130 and 140 of FIG. 1. Some of the operations in the method may be carried out by processors of the datacenters from and to which the data is being transferred, whereas some operations may be carried out by processors of other datacenters, or processors and servers independent of the datacenters or geographical regions.

At block 310, data may be uploaded to a datacenter belong to a first region of the network. The uploaded data may include a data object as well as metadata of the uploaded data object, such as a time of upload, a type of data object, a location from which the object is uploaded, and so on.

At block 320, access information about previously uploaded data that was previously stored in the network may be received and analyzed. The previously uploaded data may have also included metadata at the time of its upload, and may further have additional metadata that was gathered after the upload, such as metadata indicating a time that the previously uploaded data was accessed, locations from which the previously uploaded data was accessed, and so on.

At block 330, a prediction as to the geographical regions of the network from which the uploaded data is likely to be accessed may be made. This prediction or determination may be based on the metadata of the currently uploaded data, as well as the access information about the previously uploaded data. Additionally, the prediction may precede the currently uploaded data being accessed, whereby the metadata of the currently uploaded data at a time of upload may be sufficient for the prediction. Patterns recognized in the information of the previously uploaded data may indicate a likely outcome for access of the currently uploaded data, and thus may be used to predict an ideal location to store the currently uploaded data. In many cases, it may be preferable to store the uploaded data at the datacenter to which it is originally uploaded. However, in other cases, it may be preferable to additionally, or alternatively, store the uploaded data in a different datacenter, or even if a different geographical region.

At block 340, the uploaded data is directed to be transferred from the originating datacenter to other datacenters at which the data is likely to be accessed, The other datacenters may be located in geographical regions other than the first geographical region, thus making access to the uploaded data at those other regions more efficient. Efficiency may be a measure of accessing data faster, costing less overall bandwidth, being performed over connection having more available bandwidth, or any combination of these and other factors.

Figure 4:
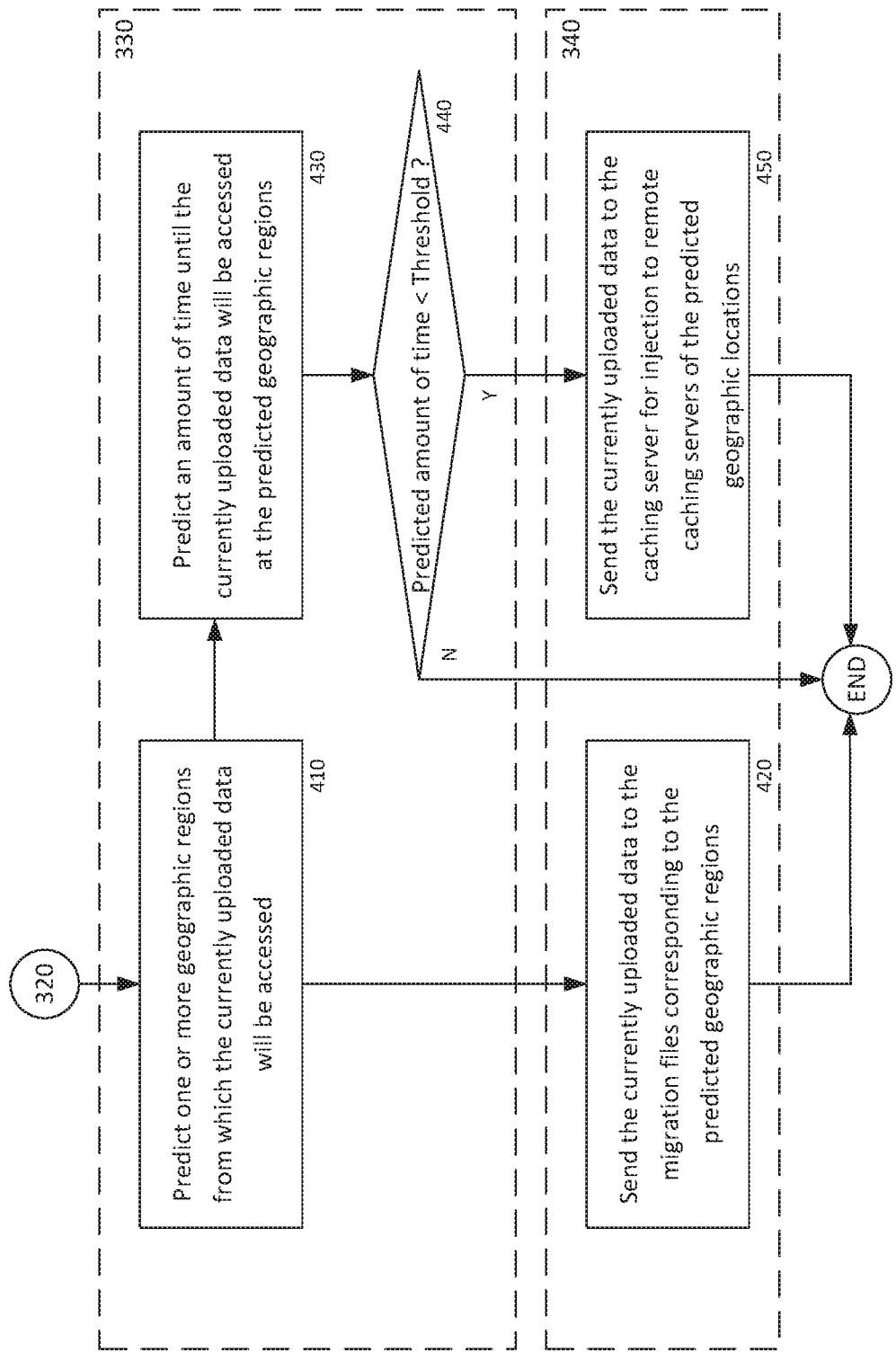

FIG. 4 is a flow diagram illustrating an example subroutine 400 of the routine 300 of FIG. 3. The subroutine 400 shows example operations that may be performed to carry out the determination of one or more destination regions for an uploaded data object, as well as distribution of the data object to one or more datacenters of the determined destination regions.

At block 410, one or more geographical regions from which the currently uploaded data will be accessed are predicted. This prediction may be made by an access prediction program, such as access location predictor 180 shown in FIG. 1, and may be based on an output from a prediction model that has been trained on access logs of previously uploaded data, such as predictive model 170 shown in FIG. 1. The prediction model may recognize access patterns of the previously uploaded data, and may predict based on those patterns where the currently uploaded data is likely to be accessed.

At block 420, the currently uploaded data may be sent, such as copied or moved, to one or more files designated for migration of uploaded data to a destination region other than the first region, such as migrations files 190 of FIG. 1. The files to which the currently uploaded data is sent may be based on the prediction of block 410, whereby the data will be transferred to those regions at which it is expected to be accessed.

At block 430, an amount of time until the currently uploaded data will be accessed at the predicted geographical regions is predicted. This prediction may also be based on an output from the prediction model. In this case, access logs of previously uploaded data fed to the prediction model as training data should include information from which a direction between upload and a first access of the previously uploaded data can be determined or derived, such as an upload time, and a log of a first time or every time at which the data is accessed. The prediction model may recognize access patterns of the previously uploaded data, and may predict based on those patterns when the currently uploaded data is likely to be accessed.

At block 440, the prediction of when the currently uploaded data is likely to be accessed may be compared to a threshold value, such as an amount of time from a current time. If the predicted amount of time until the currently uploaded data is accessed exceeds or is equal to the threshold amount, meaning that the currently uploaded data is not expected to be accessed on a relatively immediate basis, then operations may conclude, and the data may be migrated at a relatively slow pace using the one or more migration files. Conversely, if the predicted amount of time until the currently uploaded data is accessed is less than the threshold amount, meaning that the currently uploaded data is expected to be accessed on a relatively immediate basis, then operations may continue at block 450, whereby the currently uploaded data is sent (copied or moved) to a caching server, such as caching server 195 of FIG. 1, to be injected into caching servers of a remote datacenter, either in the same geographical region or in one or more different geographical regions. As with the migration files, the determination of which datacenters, regions, or both to which the data is injected may be based on the determinations of the access location predictor at block 410.

In the example of FIG. 4, the decision to send uploaded data to a migration file is shown as having been made prior to determining an urgency or priority of transferring the data. Thus, the determination to migrate the data is made regardless of whether the data is needed sooner or later, that is, whether the data is also injected or not to the destinations. However, in other examples, there may be data that is likely to be accessed only on an immediate basis and not accessed at later times, such as a live streamed video with a relatively short shelf life. In such cases, the system may determine to inject the uploaded data to caching servers of remote datacenters, but to not add the uploaded data to migration files in order to avoid the data needlessly being stored permanently at the remote datacenters.

Figure 5:
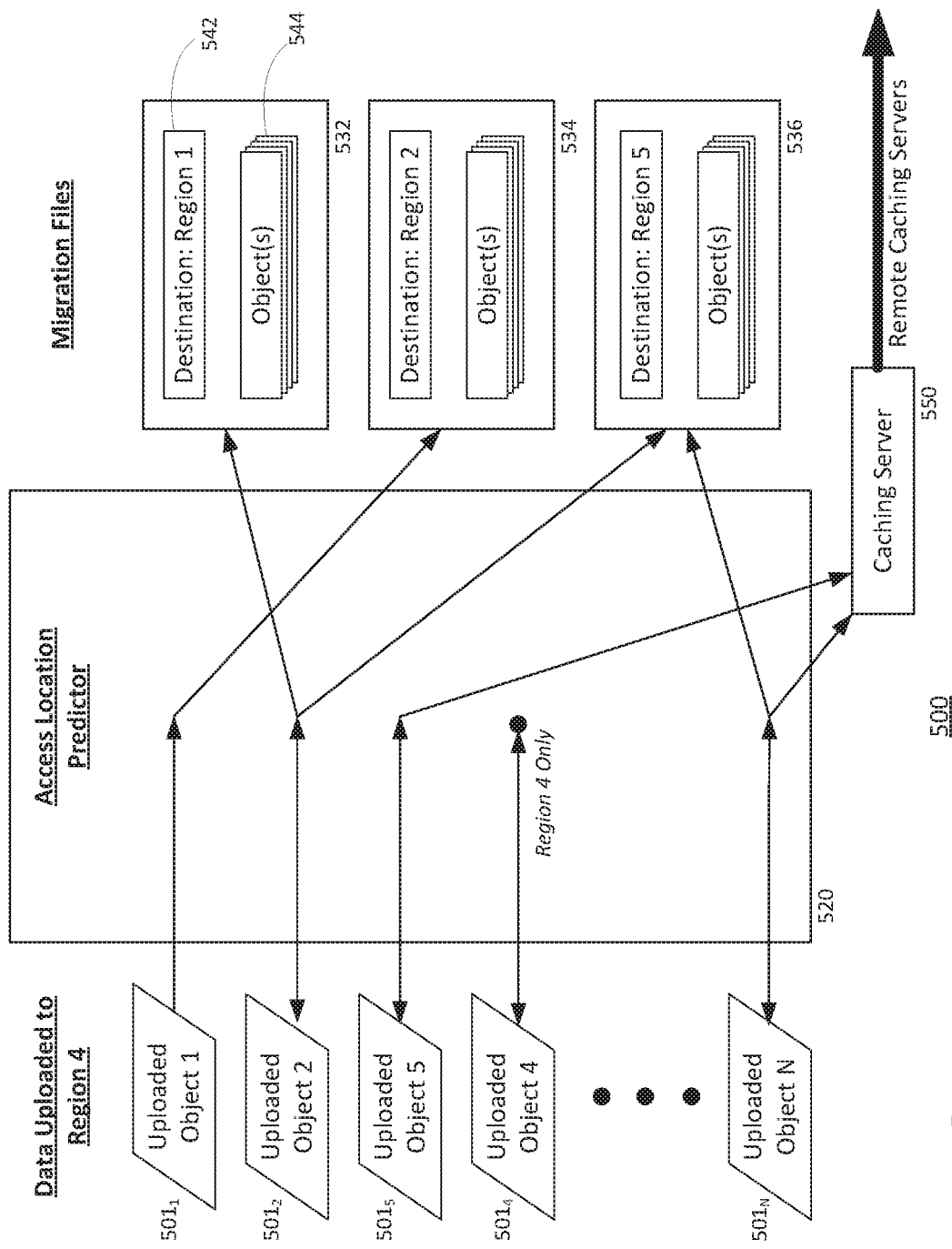
FIG. 5 is a flow diagram illustrating an example method according to aspects of the disclosure.

FIG. 5 is a operational block diagram 500 showing an example operation of an access location predictor 520 predicting geographical regions of the network from which uploaded data is likely to be accessed, and directing the uploaded data to be transferred to the predicted geographical regions, such as is shown in blocks 330 and 340 of routine 300 of FIG. 3. The access location predictor 520 selectively moves or copies data objects $501_1$-$501_N$ uploaded to a datacenter of Region 4 to migration files 532, 534, 536, caching servers 550, or both. Also as noted above, the access location predictor 520 may determine a placement of each uploaded data object $501_1$-$501_N$ based on metadata from the object and an output of the predictive model used to predict the location or locations at which the uploaded data is likely to be accessed.

In the example of FIG. 5, each of the uploaded data objects $501_1$-$501_N$ has different metadata. Thus, the access location predictor 520 determines a different placement strategy for each of the uploaded data objects $501_1$-$501_N$.

In the example of Uploaded object 1 ($501_0$), the access location predictor 520 determines that this object is likely to be accessed at Region 2. Therefore, object 1 is moved from the data server to migration file 534, which may be a file dedicated for objects that are to be migrated from the datacenter at which object 1 is uploaded to Region 2.

As shown in FIG. 5, each migration file may include common metadata 542, such as a header to the file, which may indicate a destination of the file. Presenting common metadata avoids the need for this metadata to be separately written to the migration file for each appended object 544, which may save space in the migration file and may further reduce processing requirements for moving the objects from the data server to the migration file. In the case of a destination region, there is also no need for this metadata to be rewritten to the object after the migration, since the destination region will remain common metadata of the object and all the other objects stored at the region. Aside from the common metadata, such as the destination region, the remaining metadata of each object may be moved or copied with the object so as to preserve the object metadata during the migration.

In some examples, the migration file may have a predetermined capacity, whereby when moving or copying an object to the migration file causes the migration file to meet or exceed the predetermined capacity, the migration file may be transferred to one or more datacenters of the destination region. Additionally, or alternatively, the migration file may be transferred to one or more datacenters of the destination region after a predetermined amount of time has elapsed since creation of the migration file. Operations for transferring the objects are described in greater detail below in connection with FIG. 4.

If it is determined that the object is likely to be accessed from only one region, so then the object may be moved to a single destination, such as in the example of Object 1 ($501_1$). However, in other cases, it may be determined that an object is likely to be accessed from more than one region, including or excluding the region at which the object is uploaded. In such a case, the access location predictor 520 may determine to move or copy the object to more than one migration file.

In the example of Uploaded object 2 ($501_2$) the access location predictor 520 determines that this object is likely to be accessed at each of Regions 1, 3 and 4. Therefore, object 2 is copied from the data server to each of migration files 532 and 536, which may be files dedicated for objects that are to be migrated from the datacenter at which object 2 is uploaded to Regions 1 and 3. The object may also remain permanently stored at the data server so that it may be accessed at Region 4.

As noted above, migration of objects from one region to another may begin after the file has been filled with several data objects. Since the migration file may be large, it may take time before the migration file is filled. However, in some cases, a data object may be in high demand at a remote region of the network, but only for a time before the data migration occurs. In this case, the slow-paced strategic relocation of data objects using migration files would undermine the ability for users of the other regions to efficiently access the data object while it is in high demand. For example, if a user is streaming live video in Europe and several users in the United States wish to access the streamed video immediately, waiting for the video file to migrate from a datacenter in Europe to a datacenter in the United States would not be helpful, and there may not even be a demand for the streamed video anymore after it is stored in the datacenter in the United States.

In order to address this challenge, the object file may include metadata from which it may be determined how soon after the data is uploaded that it will be accessed. For example, in the system of FIG. 1, the metadata aggregator 160 can collect metadata showing both a time of upload and a time of earliest download for each stored object. This data may then be used to train the predictive model 170 to predict whether a future uploaded data object will be accessed soon after or long after the object is uploaded to the system. In turn, this information may be used by the access location predictor 180 to determine, for any given uploaded data object, an amount of time until the object is likely to be downloaded. The system may further store a threshold time value, whereby if the predicted amount of time until an object is likely to be downloaded is equal to or less than the threshold amount, then the object may bypass the usual data migration scheme via the migration files, and be moved or copied to a caching server 350 for a relatively faster transfer of the uploaded data object to other regions of the system.

In the example of Uploaded object 3 ($501_3$) the access location predictor 520 determines that this object is likely to be in high demand within a threshold amount of time. Therefore, object 3 is copied from the data server to a caching server 550, so that the file may be injected to the caching servers of remote datacenters in Region 4 as well as in other regions, including but not limited to Region 1, Region 2 and Region 3, based on the determinations of the access location predictor 520. Object 3 may remain stored at the data server of the datacenter.

In many cases, it may be determined that an uploaded object is likely to be accessed from only the region at which it was uploaded. This may be the case for personally stored files that are not shared among users, or for files that shared among a group of users in close geographic proximity to one another. In such cases, the access location predictor 520 may determine that the uploaded object should not be copied to either a migration file 532, 534, 536 or to a caching server 550. Instead, the object remains stored at a data server of the datacenter where the object was uploaded. In the example of Uploaded object 4 ($501_4$) the access location predictor 520 determines that this object is likely to be accessed at only the originating Region 4. Therefore, object 4 is not copied from the data server.

It should be noted that keeping a file at a data server, copying the file to a migration file, or copying the file to a caching server, may be treated as independent operations. Thus, the decision to perform one operation does not preclude any other operation from being performed. For example broadcast data, such as a streamed video file, may be in high demand across multiple regions both immediately as well as at a later time. In such a case, it may be determined that the file should remain in the originating data server, as well as copied to both a migration file and caching server to address both long term and short term demand. The determination may be based at least in part on the uploaded data being broadcast data, as well as on other access patterns detected by the predictive model.

In the example of Uploaded object N ($501_N$) the access location predictor 520 determines that this object is likely to be in high demand within a threshold amount of time, as well as at a later time, at both Regions 3 and 4. Therefore, object N is copied from the data server to both migration file 536 and caching server 550, so that the object may be injected to the caching servers of Region 3 to address immediate demand, as well as migrated to permanent storage of Region 3 to address long term demand.

Figure 6:
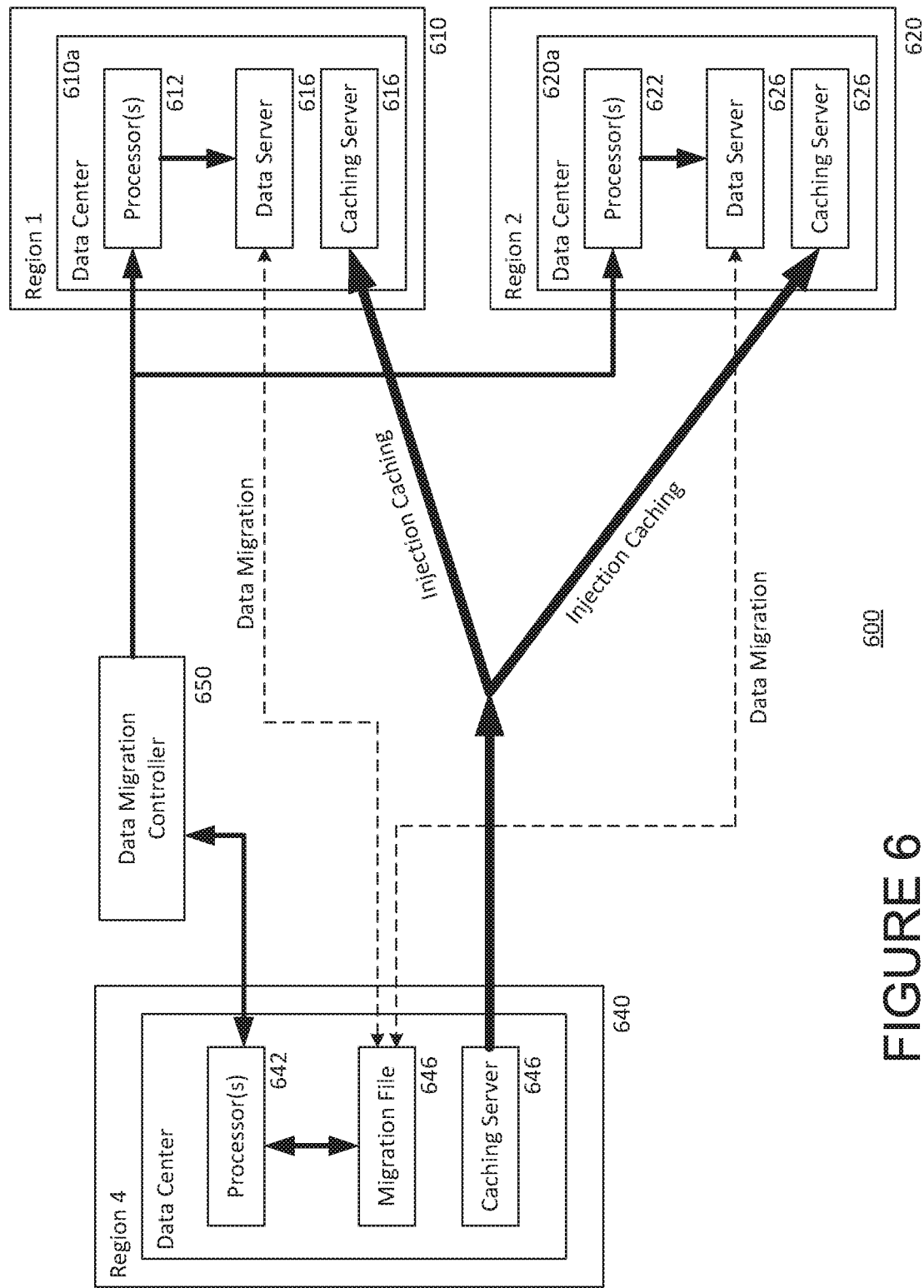
FIG. 6 is flow diagram illustrating aspects of the flow diagram of FIG. 5.

FIG. 6 is a block diagram showing an example operation for distributing uploaded data objects according to the determinations made by the access location predictor, such as access location predictor 180 of FIG. 1 or access location predictor 520 of FIG. 5. The example of FIG. 6 shows an uploaded object that is both migrated (long term) and injected (short term) from Region 4 (640) to both Region 1 (610) and Region 2 (620) of a distributed network system 600. Each region may include one or more datacenters 610*a*, 620*a*, 640*a*, whereby each datacenter may include one or more respective processors 612, 622, 642, data servers 614, 624 (not shown for Region 4), and caching servers 616, 626, 646. For purposes of illustration, migration files 644 are shown as being stored at the datacenter 640 of Region 4, although migration files may also be stored at the datacenters of other regions to facilitate transferring objects that are uploaded at those other regions to also be transferred throughout the network.

In operation, moving the contents of the migration files 644 of the Region 4 datacenter 640*a* may begin with a data migration controller 650 of the system 600 executing a program whereby the datacenter 610*a* is queried for files of data stored in its servers. The processor 642 may receive the query, and in response may provide information indicating the destination of each file. In the case of files to be stored at Region 4, whereby the destination is Region 4, the data migration controller 650 may take no further action. Conversely, in the case of files to be stored at other regions, such as Regions 1 and 2, whereby the destination indicated by the file is not Region 4, the data migration controller 650 may determine to initiate a migration of data from the files to the identified destinations. The data migration controller 650 may transmit an instruction to one or more processors of each identified destination, such as processors 612, 622. Based on these instructions, the processors may instruct data servers 614, 624 at their respective locations to perform the data migration, whereby each data server 614, 624 may access and read the respective migration file 644 at Region 4. After reading the migration file 644, the contents of the migration file 644 may be deleted. This process may be repeated for future data objects that are uploaded to the datacenter 610*a* in Region 4 (640).

Moving the contents of the caching server 646 of the Region 4 datacenter 640*a* may begin with the server 646 prefetching the data to be transferred, and injecting it to caching servers 616, 626 of remote datacenters according to instructions of the access location predictor. The injection may be performed on a relatively immediate scale, meaning that there are no further steps to be executed prior to initiating the data injection. This may make the data available in the other datacenters as fast as possible. Unlike data migration, in which data may be stored at a fixed and limited number of datacenters and a fixed and limited number of locations of a destination region, cache injection may place copies of the uploaded and transferred object in multiple datacenters of any given region to which it is sent, including but not limited to caches of all datacenters of the destination region. This may allow for on-demand data to be accessed by many users in a short period of time. Synchronous cache injection is relatively fast and efficient, compared to synchronous replication.

The above examples refer to data distribution schemes according to datacenters and regions. However, those skilled in the art will readily recognize that the same principles may be applied to other systems in which data is organized differently. The underlying principle is that some portions of a large scale network, such as a global network may be closer to any given user than other parts of the network, and to the extent that one may predict the locations from which data will be accessed, it may be advantageous to move the data after it has been uploaded to closer to those locations where it will be accessed. To this extent, if it can be predicted that a particular one or group of users are likely to access the data in the future, that the data can be moved to datacenters, servers, or other units storage that are closer to the predicted accessing users.

Additionally, the above examples generally describe locations as being closer to a user when that location is geographically closer. However, those skilled in the art will recognize that "closeness" of data is not necessarily a measure of geographic distance, but rather a measure of cost to access data. Thus, when data is positioned "closer" to a user or group of user, or "closer" to a location from which the data is predicted to be accessed, the location may be chosen so as to reduce overall costs for accessing the data, such as bandwidth, time, fees for bandwidth use being contracting parties, any combination of these or other factors.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for storing data in a distributed network having a plurality of datacenters distributed over a plurality of geographic regions and accessed by a plurality of users, the data including metadata and being accessible to the plurality of users, the metadata indicating one or more storage locations of the data within the distributed network, and respective geographic locations from which the data was uploaded, wherein each geographic region includes at least one of the plurality of users, the method comprising:
receiving, by one or more processors, data uploaded by a first user of the plurality of users to a first datacenter of the distributed network;
receiving, by the one or more processors, access information about access by the plurality of users to previously uploaded data;
prior to the uploaded data being accessed by any of the plurality of users, predicting, by the one or more processors, one or more of the plurality of geographic regions from which the uploaded data will be accessed by one or more of the plurality of users based at least in part on the storage locations of the previously uploaded data within the distributed network, the geographic locations from which the previously uploaded data was uploaded, and the access information about access to the previously uploaded data by one or more of the plurality of users other than the first user; and
instructing, by the one or more processors, the uploaded data to be transferred from the first datacenter to one or more second datacenters located at each of the one or more predicted geographic regions.

2. The method of claim 1, wherein the access information is derived from a predictive model trained on metadata of the previously uploaded data.

3. The method of claim 2, wherein the predictive model is a decision tree model.

4. The method of claim 2, wherein the metadata of the previously uploaded data includes an identification of a user uploading the previously uploaded data, and wherein the one or more of the plurality of geographic regions from which the uploaded data will be accessed by one or more of the plurality of users is predicted based at least in part on the identification of the user uploading the previously uploaded data.

5. The method of claim 1, wherein the metadata includes an identification of a user uploading the uploaded data, and wherein the one or more of the plurality of geographic regions from which the uploaded data will be accessed by one or more of the plurality of users is predicted based at least in part on the identification of the user uploading the previously uploaded data.

6. The method of claim 5, wherein the previously uploaded data includes one or more files, wherein the metadata of the previously uploaded data includes file characteristic data of the one or more files, wherein the file characteristic data includes at least one of: a name of a corresponding file; a size of the corresponding file; or an identification of a directory or a file path at which the corresponding file is stored, and wherein the one or more of the plurality of geographic regions from which the uploaded data will be accessed by one or more of the plurality of users is predicted based at least in part on the file characteristic data.

7. The method of claim 1, wherein the access information indicates an amount of time between an initial upload of the previously uploaded data and a first download of the previously uploaded data, wherein the method comprises:
predicting, by the one or more processors, an amount of time until the uploaded data is downloaded for a first time based on the metadata and the access information; and
instructing, by the one or more processors, the uploaded data to be transmitted to one or more caching servers located at the one or more predicted geographic regions, based on the predicted amount of time.

8. The method of claim 7, wherein instructing the uploaded data to be transmitted to one or more caching servers located at the one or more predicted geographic regions further includes:
determining, by the one or more processors, that the uploaded data is broadcast data based on the metadata and the access information; and
for each given predicted geographic region, instructing, by the one or more processors, the uploaded data to be transferred to at least one caching server of each datacenter of the given predicted geographic region.

9. The method of claim 1, further comprising:
instructing, by the one or more processors, the uploaded data to be included in a file including previously uploaded data having a common predicted geographic region; and
instructing, by the one or more processors, the file to be transferred to one or more second datacenters located at the common predicted geographic region.

10. The method of claim 9, wherein the file is initially stored at one or more source servers located at first datacenter, and wherein instructing the file to be transferred includes instructing, by the one or more processors, data servers of the one or more second datacenters located at the common predicted geographic region to pull the file from the one or more source servers.

11. A system for storing data in a distributed network having a plurality of datacenters distributed over a plurality of geographic regions and accessed by a plurality of users, the data including metadata and being accessible to the plurality of users, the metadata indicating one or more storage locations of the data within the distributed network, and respective geographic locations from which the data was uploaded, wherein each geographic region includes at least one of the plurality of users, the system comprising:
one or more storage devices at a first datacenter of the distributed network, configured to store data uploaded to the first datacenter by a first user of the plurality of users, the uploaded data including metadata and being accessible to the plurality of users; and
one or more processors in communication with the one or more storage devices, the one or more processors configured to:
receive access information about access by the plurality of users to previously uploaded data that was previously stored in the plurality of datacenters of the distributed network;
prior to the uploaded data being accessed by any of the plurality of users, predict one or more of the plurality of geographic regions from which the uploaded data will be accessed by one or more of the plurality of users based at least in part on the storage locations of the previously uploaded data within the distributed network, the geographic locations from which the previously uploaded data was uploaded, and the access information about access to the previously uploaded data by one or more of the plurality of users other than the first user; and
instruct, the uploaded data to be transferred from the first datacenter to one or more second datacenters located at each of the one or more predicted geographic regions.

12. The system of claim 11, wherein the access information is derived from a predictive model trained on metadata of the previously uploaded data.

13. The system of claim 12, wherein the predictive model is a decision tree model.

14. The system of claim 12, wherein the metadata of the previously uploaded data includes an identification of a user uploading the previously uploaded data and wherein the one or more processors are configured to predict the one or more of the plurality of geographic regions from which the uploaded data will be accessed by one or more of the plurality of users based at least in part on the identification of the user uploading the previously uploaded data.

15. The system of claim 11, wherein the metadata includes an identification of a user uploading the uploaded data, and wherein the one or more processors are configured to predict the one or more of the plurality of geographic regions from which the uploaded data will be accessed by one or more of the plurality of users based at least in part on the identification of the user uploading the previously uploaded data.

16. The system of claim 15, wherein the previously uploaded data includes one or more files, wherein the metadata of the previously uploaded data includes file characteristic data of the one or more files, wherein the file characteristic data includes at least one of: a name of a corresponding file; a size of the corresponding file; or an identification of a directory or a file path at which the previously uploaded data is stored, and wherein the one or more processors are configured to predict the one or more of the plurality of geographic regions from which the uploaded data will be accessed by one or more of the plurality of users based at least in part on the file characteristic data.

17. The system of claim 11, wherein the access information indicates an amount of time between an initial upload of the previously uploaded data and a first download of the previously uploaded data, wherein the one or more processors are configured to:
predict an amount of time until the uploaded data is downloaded for a first time based on the metadata and the access information; and
instruct the uploaded data to be transmitted to one or more caching servers located at the one or more predicted geographic regions, based on the predicted amount of time.

18. The system of claim 17, wherein the one or more processors are configured to instruct the uploaded data to be transmitted to one or more caching servers located at the one or more predicted geographic regions based on a determination that the uploaded data is broadcast data based on the metadata, and wherein for each given predicted geographic region, the one or more processors are configured to instruct the uploaded data to be transferred to at least one caching server of each datacenter of the given predicted geographic region.

19. The system of claim 11, wherein the one or more processors are configured to:
instruct the uploaded data to be included in a file including previously uploaded data having a common predicted geographic region; and
instruct the file to be transferred to one or more second datacenters located at the common predicted geographic region.

20. The system of claim 19, wherein the file is initially stored at one or more source servers located at first datacenter, and wherein the one or more processors are configured to instruct data servers of the one or more second datacenters located at the common predicted geographic region to pull the file from the one or more source servers.

* * * * *